United States Patent
Thyni et al.

(10) Patent No.: US 9,686,696 B2
(45) Date of Patent: Jun. 20, 2017

(54) ADJUSTING RAN CAPABILITY BASED ON DATA TRANSPORT CHARACTERISTICS OF A BACKHAUL NETWORK IN A TELECOMMUNICATION NETWORK

(71) Applicant: TELEFONAKTIEBOLAGET L M ERICSSON (PUBL), Stockholm (SE)

(72) Inventors: Tomas Thyni, Järfälla (SE); Mats Forsman, Rönninge (SE); Erik Friman, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 15/022,980

(22) PCT Filed: Oct. 1, 2013

(86) PCT No.: PCT/SE2013/051139
§ 371 (c)(1),
(2) Date: Mar. 18, 2016

(87) PCT Pub. No.: WO2015/050482
PCT Pub. Date: Apr. 9, 2015

(65) Prior Publication Data
US 2016/0234698 A1   Aug. 11, 2016

(51) Int. Cl.
*H04W 24/02*   (2009.01)
*H04W 24/08*   (2009.01)
(Continued)

(52) U.S. Cl.
CPC .......... *H04W 24/02* (2013.01); *H04W 24/08* (2013.01); *H04W 52/143* (2013.01); *H04W 52/52* (2013.01); *Y02B 60/50* (2013.01)

(58) Field of Classification Search
CPC ... H04W 24/02; H04W 24/08; H04W 52/143; H04W 52/52; H04W 52/14;
(Continued)

(56) References Cited

U.S. PATENT DOCUMENTS

| 7,729,243 B2 * | 6/2010 | Ananthaiyer ......... H04W 28/22 370/230 |
| 8,126,496 B2 * | 2/2012 | Brisebois ............ H04W 52/143 370/252 |

(Continued)

FOREIGN PATENT DOCUMENTS

| EP | 0987817 A1 | 3/2000 |
| EP | 2439988 A1 | 4/2012 |

(Continued)

*Primary Examiner* — Pablo Tran

(57) ABSTRACT

Method and radio base station for adapting a Radio Access Network, RAN, capability, in response to variations in transport characteristics, such as data transfer rate, maximum available bandwidth, and maximum used bandwidth, of a backhaul network. The radio base station is arranged to communicate data between a RAN and the backhaul network, said method comprising to obtain, by a controller, information related to the transport characteristics of the backhaul network. The method comprises further to determine, by the controller, based on the obtained information, an output level of the radio base station, and to adjust, by the controller, the output level of the radio base station to the determined output level.

14 Claims, 7 Drawing Sheets

(51) Int. Cl.
*H04W 52/14* (2009.01)
*H04W 52/52* (2009.01)

(58) Field of Classification Search
CPC ............. H04W 52/267; H04W 84/045; H04W 52/325; Y02B 60/50; H04J 1/16
See application file for complete search history.

(56) References Cited

U.S. PATENT DOCUMENTS

| | | |
|---|---|---|
| 8,170,544 B1 | 5/2012 | Satapathy et al. |
| 8,363,564 B1 | 1/2013 | Talley et al. |
| 9,113,354 B2* | 8/2015 | Picker ............... H04W 28/0247 |
| 9,313,004 B2* | 4/2016 | Yanover ............... H04L 5/0053 |
| 9,332,458 B2* | 5/2016 | Nuss ..................... H04W 28/08 |
| 9,414,310 B2* | 8/2016 | Grayson ........... H04W 52/0206 |
| 2009/0170472 A1* | 7/2009 | Chapin ................ H04W 28/18 455/410 |
| 2009/0170547 A1* | 7/2009 | Raghothaman ....... H04L 1/0002 455/522 |
| 2009/0285159 A1* | 11/2009 | Rezaiifar .......... H04W 72/0486 370/328 |
| 2012/0044908 A1* | 2/2012 | Spinelli ................ H04W 92/02 370/331 |
| 2013/0070742 A1 | 3/2013 | Picker et al. |

FOREIGN PATENT DOCUMENTS

| | | |
|---|---|---|
| GB | 2454872 A | 5/2009 |
| WO | 2011094644 A1 | 8/2011 |
| WO | 2012059131 A1 | 5/2012 |
| WO | 2013079556 A1 | 6/2013 |
| WO | 2014065725 A1 | 5/2014 |

* cited by examiner

ADJUSTING RAN CAPABILITY BASED ON DATA TRANSPORT CHARACTERISTICS OF A BACKHAUL NETWORK IN A TELECOMMUNICATION NETWORK

This application is a 371 of International Application No. PCT/SE2013/051139, filed Oct. 1, 2013, the disclosure of which is fully incorporated herein by reference.

TECHNICAL FIELD

The present disclosure relates to adaption of radio capabilities in wireless communication networks, especially it relates to adaption of radio capabilities of Radio Access Networks in dependence of data transport characteristics of backhaul networks.

BACKGROUND

Modern telecommunication networks are commonly divided in separate parts, which are defined as RAN (Radio Access Network), core network, and backhaul network. The RAN serves UEs (User Equipments) and provides users of the UEs with communication capabilities, by providing DL data from radio base stations to the UEs and UL data from the UEs to the radio base stations. The mobile core network is a central part of the telecommunication network and provides various services to the users who are connected by the RAN, e.g. telephony and data communication. The backhaul network is the intermediate connecting network, which connects the RAN to the mobile core network.

In this description, the term "User Equipment" will be used to denote any suitable communication terminal adapted to communicate with a radio base station. A UE may be implemented as a mobile phone, a PDA (Personal Digital Assistant), a handheld computer, a laptop computer, etc. A "radio base station" may be implanted as a NodeB, an eNodeB, a repeater, etc.

With reference to FIG. 1, which is a schematic block diagram, a communication scenario will now be described according to the prior art.

A telecommunication network is illustrated in the figure and comprises a RAN where an RBS (Radio base station) 120 is present, a backhaul network where an RNC (Radio Network Controller) 100 and a core network node 140 are present, and a core network. The communication network nodes, i.e. the RBS 120, the RNC 100 and the core network node 140 are connected to each other by communication links L.

Typically, the RBS 120 comprises conventional functionality (illustrated with a box "RBS") for downloading DL data to UEs and uploading UL data from the UEs, antennas (not shown), etc. The RNC 100 comprises conventional functionality (illustrated with a box "RNC") for exchanging DL and UL data between a plurality of RBSs 120 and the core network node 140. The core network node 140 comprises ordinary functionality (illustrated with a box "Core") for distributing the DL and UL data between the RNC 100 and the core network.

Traditionally, the RANs have been bottlenecks in the telecommunication networks, due to limited communication capabilities of the radio interface to the UEs. For instance, in communication systems using GSM (Groupe Special Mobile) or earlier RAN generations, the backhaul networks are often capable of providing services at higher data rates than the RANs are capable to deliver.

However, with the emergence of services, new RAN technologies have been introduced which are capable of serving the UEs with increased data rates. For instance, UMTS (Universal Mobile Telecommunication System), LTE (Long Term Evolution) and LTE Advanced systems have been defined by the 3GPP (Third Generation Partnership Project), and enables UL/DL data to be exchanged at increased data rates.

Today, the backhaul networks will not always be capable of delivering the desired data rates for communication of DL/UL data. For instance, this will be the case when backhaul links are affected by various disturbances, or when the installed backhaul capability is restricted due to aggregation of data traffic. When the users of the UEs performs services and the backhaul network is not capable of delivering the required data transfer rate, the users experience of the services may be that they are slow and/or time lagging, which may be perceived as annoying by the users.

To upgrade the communication links in the backhaul networks, for instance by installing fibre optic cables as communication links, requires a reasonable amount of resources and is time consuming and expensive.

Thus, there is a problem to devise a method for adapting RAN capabilities to variations in backhaul network characteristics.

SUMMARY

It would be desirable to obtain improved user experience in telecommunication networks. It is an object of this disclosure to address at least any of the issues outlined above. Further, it is an object to provide a mechanism for adaption of RAN (Radio Access Network) capabilities in response to variations in transport characteristics of backhaul networks. These objects may be met by a method and an arrangement according to the attached independent claims.

According to one aspect, a method performed by a radio base station is provided for adapting a Radio Access Network, RAN, capability, in response to variations in transport characteristics, such as data transfer rate, maximum available bandwidth, and maximum used bandwidth, of a backhaul network. The radio base station is arranged to communicate data between a RAN and the backhaul network, said method comprising to obtain, by a controller, information related to the transport characteristics of the backhaul network. The method comprises further to determine, by the controller, based on the obtained information, an output level of the radio base station, and to adjust, by the controller, the output level of the radio base station to the determined output level. By adjusting RAN capabilities to the actual transport characteristics of the backhaul network, less energy or power may be consumed by the RBSs, which may give rise to decreased heat dissipation and decreased environmental effects.

The output level of the RBSs may be adjusted by adjusting bias voltages of Power Amplifiers, PAs, of the RBSs. By adjusting bias voltages of PAs instead of Direct Current, DC, power, further less energy may be consumed. In addition, when decreasing RAN capabilities, less calculation capacity of Digital Signal Processors, DSPs may be required, which may enable some DSPs to be switched off.

Radio base stations which consume less power and energy may be cost effective for the operators and may give rise to decreased environmental effects. In addition, because less power needs to be supplied, the radio base stations may produce less excess heat, and dimensions of any cooling arrangements in the radio base stations may, therefore, be decreased. Furthermore, because cooling arrangements typically consume energy to remove excess heat, the decreasing dimensions of cooling arrangement may in addition give rise to further reduced power consumption and decreased environmental effects.

The information regarding variations in backhaul characteristics may be obtained from various measurements performed in the backhaul network.

By acquiring knowledge of variations of transport characteristics in backhaul networks, RAN capabilities may be adjusted, e.g. by performing handover of UEs to other radio base stations which have better backhaul transport characteristics. Thereby, user experience for the users of the UE may be increased. In addition, an operator of the communication network may make better use of installed transport capacity.

By compiling results from a plurality of measurements into a backhaul characteristics value, as well current variations of backhaul characteristics and trends of variations may into account when deciding or selecting to adjust RAN capabilities. Furthermore, operator policies and RAN reports may in addition be taken into account, which may achieve a further more flexible use of installed transport capacity.

It is to be noted that according to another aspect, a corresponding communication network node which is adapted to perform the described method is also applicable.

BRIEF DESCRIPTION OF DRAWINGS

The solution will now be described in more detail by means of exemplary embodiments and with reference to the accompanying drawings, in which.

DETAILED DESCRIPTION

In telecommunication networks where RBSs (Radio Base Stations) are arranged to exchange data between RANs (Radio Access Networks) and a backhaul network, transport characteristics of the backhaul network may be restricted, even if the RANs are capable of serving a large quantity of UEs (User Equipment).

Today, RAN transport capabilities are determined, but backhaul characteristics is not taken into account when managing UEs in the RANs, e.g. for handling handover, or scheduling. For instance, an RBS which has good RAN characteristics may serve more UEs than the backhaul network is capable to. The user's QoE (Quality of Experience will then not be satisfying.

RBSs consume significant amount of power during operation, especially for transmitting DL (Downlink) data to UEs. Typically, RBSs comprise a plurality of PAs (Power Amplifiers) which are applied for providing sufficient RF (Radio Frequency) power to DL radio signals to be transmitted. A PA in an RBS consumes a DC power of about 80-100 Watt during operation, depending on the output load of the RBS, which will be further discussed below, in accordance with an example.

According to the proposed solution, communication network nodes will obtain information of variations in backhaul characteristics, determining an appropriate output power of the PAs, and adjusting the output power by adjusting bias voltages of the PAs.

Figure 1:
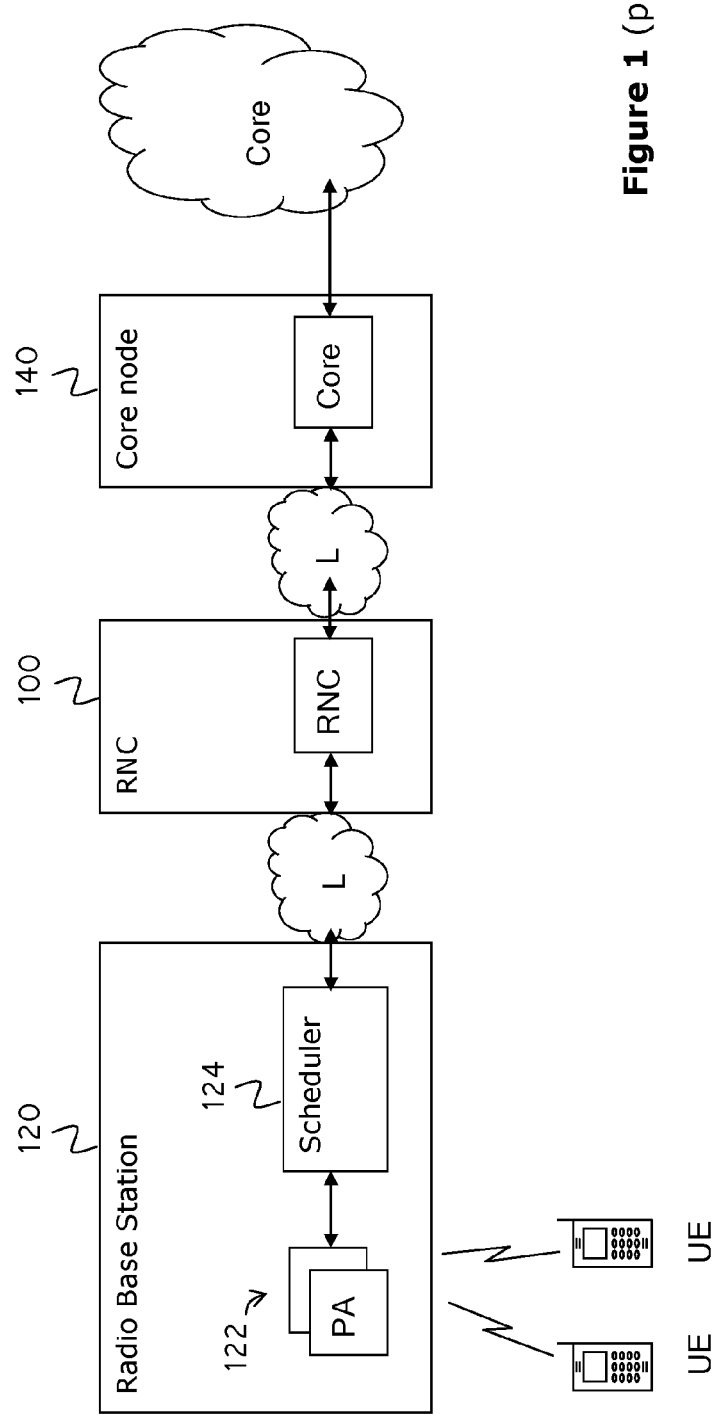
FIG. 1 is a schematic illustration of an arrangement in accordance with the prior art.
Figure 2:
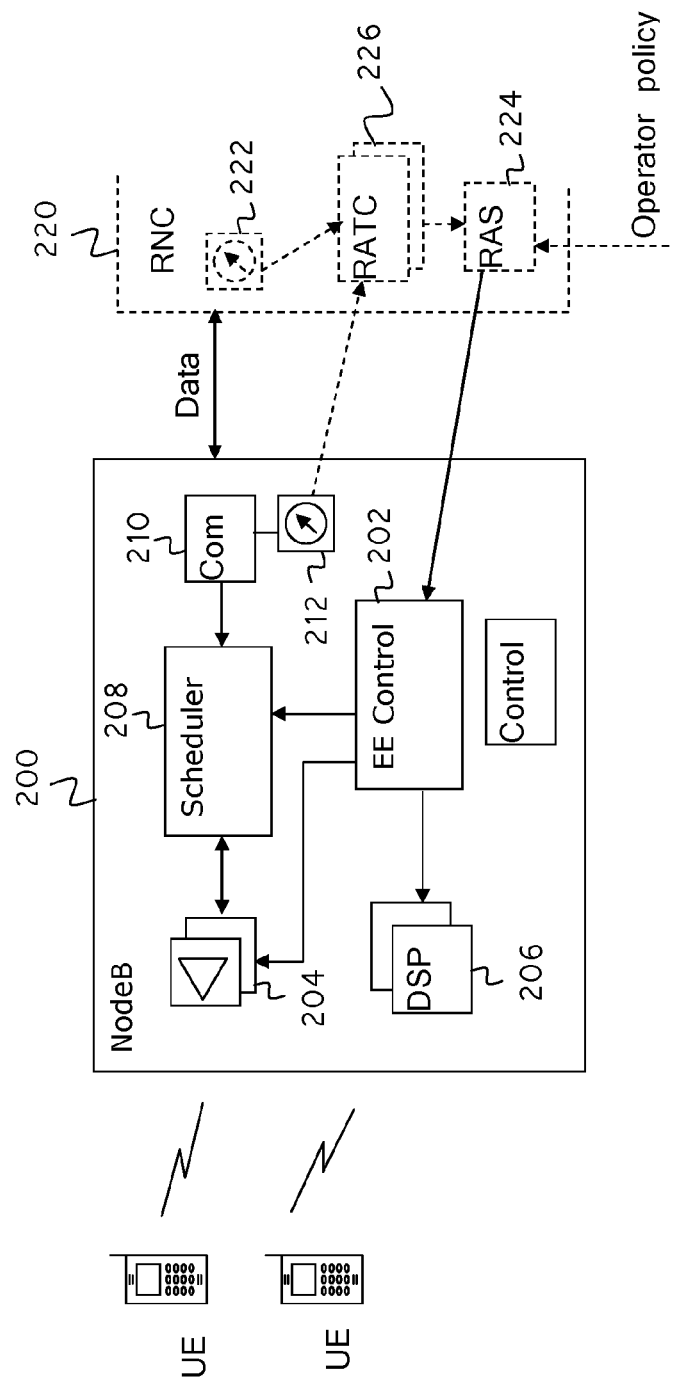
FIG. 2 is a schematic illustration of an arrangement, according to a possible embodiment.

With reference to FIG. 2, which is a schematic block diagram, an RBS 200 will now be described, in accordance with one exemplifying embodiment.

The RBS 200 is implemented as a NodeB 200, i.e. a radio base station of a HSPA (High Speed Packet Access) communication network. The NodeB 200 comprises an EE (Energy Efficiency) controller 202, a plurality of PAs 204, a plurality of DSPs (Digital Signal Processors) 206, a communication interface 210, and a reporting unit 212. Furthermore, the NodeB 200 comprises conventional functionality to operate properly, such as various control units, memories, and interfaces. This conventional functionality is schematic illustrated with a box marked "Control". However, in order to simplify the understanding such functionality will not be further discussed in this embodiment.

The NodeB 200 is arranged in a communication network to exchange DL (Downlink) and UL (Uplink) data between a RAN (Radio Access Network) and a backhaul network. In the figure, some UEs which are connected to the UE via the RAN are shown. Furthermore, a communication link is arranged to exchange DL and UL data with another communication network node 220. In this embodiment, the communication network node is implemented as an RNC (Radio Network Controller) 220. However, the NodeB 200 is not limited to exchange data with an RNC 220. In other exemplifying embodiments, alternative communication network nodes are arranged instead, which will be described below.

The EE controller 202 is arranged to obtain information related to transport characteristics of the backhaul network. In this embodiment, the information is received as a request to adjust RAN capabilities of the NodeB 200. The request is received from an RAS (RAN Adaptation Selection) unit 224 which is arranged in the RNC 220 to decide or select that RAN capabilities will be adjusted. Such a decision was taken by the RAS unit 224 according to a backhaul characteristics value, which was compiled by a RATC (RAN Aggregation Transport Characteristics) unit 226, from measurement results of backhaul transport characteristics. The measurement originates from at least one reporting unit 212, 222, which may be arranged in any suitable communication network nodes, e.g. in the NodeB 200 or in the RNC 220.

The EE controller 202 is adapted to adjust output power levels of the PAs 204, by adjusting bias voltages of the PAs 204. By adjusting the PA bias voltages in dependence on variations of transport characteristics in the backhaul network, a significant reduction of the power consumption of the PAs 204 is achieved. For instance, a reduction of the RF power to 50% may be achieved by reducing a PA bias voltage with 50%. To achieve the corresponding reduction of RF power by reducing the DC power of the PA, the DC power may only be reduced by about 10%. This effect will be further discussed below in accordance with one example and FIG. 6.

In an alternative embodiment which is based on the one described above, calculation capacity of DSPs 206 may in addition be reduced in response to the reduction of RF power due to the reduction of the PA bias voltage. Because a reduced DL data flow requires less calculation capacity, some DSPs may be switched off. A switched off DSP does not consume any power, and thereby, further power and energy is saved.

The NodeB 200 may in addition postpone scheduling of some UEs and temporarily switching off some PAs 204, which further reduces the power consumption of the NodeB 200. As indicated, operator policies may be pre-set, which may enable an operator to influence the adjustment of RAN capabilities further.

Even if the radio base station 200 of the described embodiments is implemented as an NodeB and the communication network is a HSPA (High speed packet access) network, the present solution is not limited thereto. The radio base station 200 may, alternatively, be implemented as any suitable radio base station in a suitable communication network. For instance, the radio base station may be implemented as an eNodeB (evolved NodeB) in an LTE (Long Term Evolution) or LTE Advanced communication network, or a suitable radio base station in a suitable radio access technology, e.g. WiFi (Wireless Fidelity), GSM (Groupe Special Mobile), CDMA (Code Division Multiple Access), SC-TDMA (Synchronous Code Time Divided Multiple Access), WiMax (Worldwide Interoperability for Microwave Access).

Figure 3:
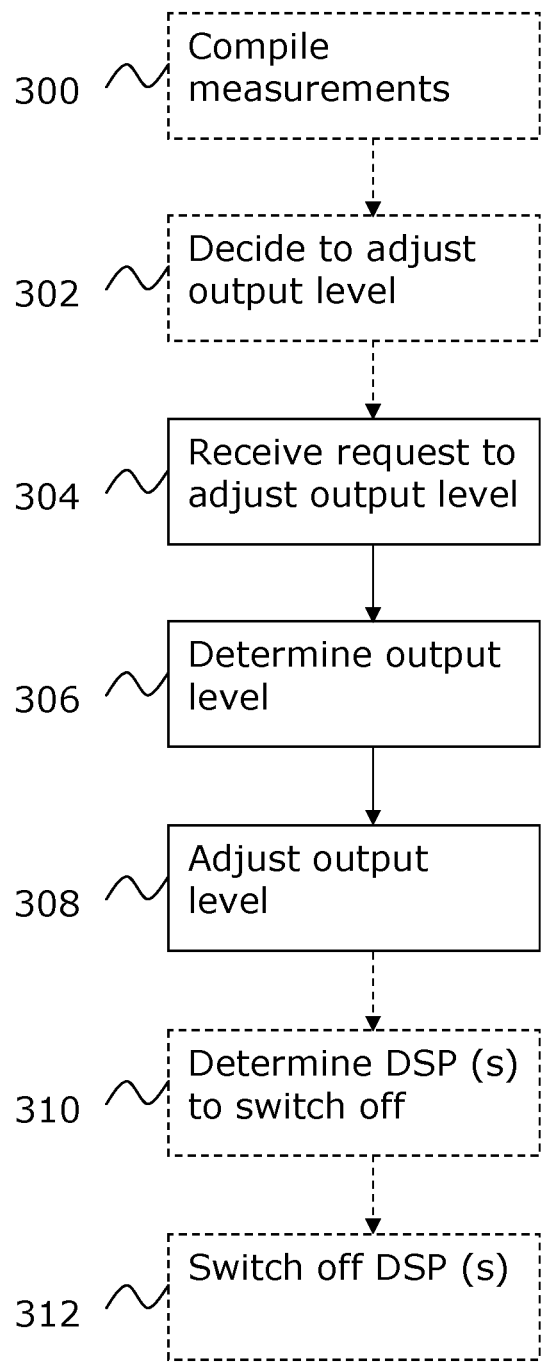
FIG. 3 is a schematic illustration of a method, according to possible embodiments.

With reference to FIG. 3, which is a schematic flow chart, a method in a radio base station will now be described in accordance with one exemplifying embodiment.

The radio base station is a NodeB, i.e. a radio base station in a HSPA (High Speed Packet Access) communication network, which is arranged to serve UEs (User Equipments), and exchange UL (uplink) data and DL (downlink) data, between the UEs and a backhaul network.

In an action 304, the NodeB obtains information of transport characteristics in the backhaul network, in form of a request to adjust an output level of the eNodeB, where the request is received from another communication network node, e.g. from an RNC.

In a subsequent action 306, the NodeB determines an output level of the radio base station based on the received request, and adjusts the output level by adjusting bias voltages of one or more PAs (Power Amplifiers) of the NodeB, in another action 308. As will be described below in an example, with a limited backhaul transport characteristics, a reduction of bias voltages of PAs achieves a substantial reduction of consumed power of the PAs, without further reduction of transport capacity.

The NodeB may further determine, in action 306, to temporarily switch off one or more PAs, i.e. setting the PA bias voltage to "0". If this is the case, the NodeB stores DL (downlink) data to be transmitted and postpones scheduling of this DL data.

In an alternative exemplifying embodiment, which is based on the one described above, an additional action 302 is performed before action 304. In action 302, the NodeB obtains the information of backhaul transport characteristics from another communication network node in form of a backhaul characteristics value. The backhaul characteristics value was compiled from results of at least one measurement for transport characteristics of the backhaul network. The action 304 differs from the above described embodiment in that the NodeB decides whether or not the output level of the NodeB will be adjusted, in response to the backhaul characteristics value. In other words, in this alternative embodiment, the NodeB comprises functionality to decide whether or not to adjust the output level of the NodeB.

In yet another alternative exemplifying embodiment, which is based on some above described embodiments, an additional action 300 is performed before action 302. In this embodiment, the NodeB further comprises functionality to compile results of measurements of transport characteristics of the backhaul network. In the action 300, the NodeB produces a backhaul characteristics value, by compiling results of measurements of transport characteristics of the backhaul network.

The NodeB may further, in an additional action 310, determine that some DSPs (Digital Signal Processors) of the NodeB may be switched off, due to reduced amount of required calculation capacity when PA bias voltages are decreased. In yet another action 312, one or more DSPs are then switched off.

Figure 4A:
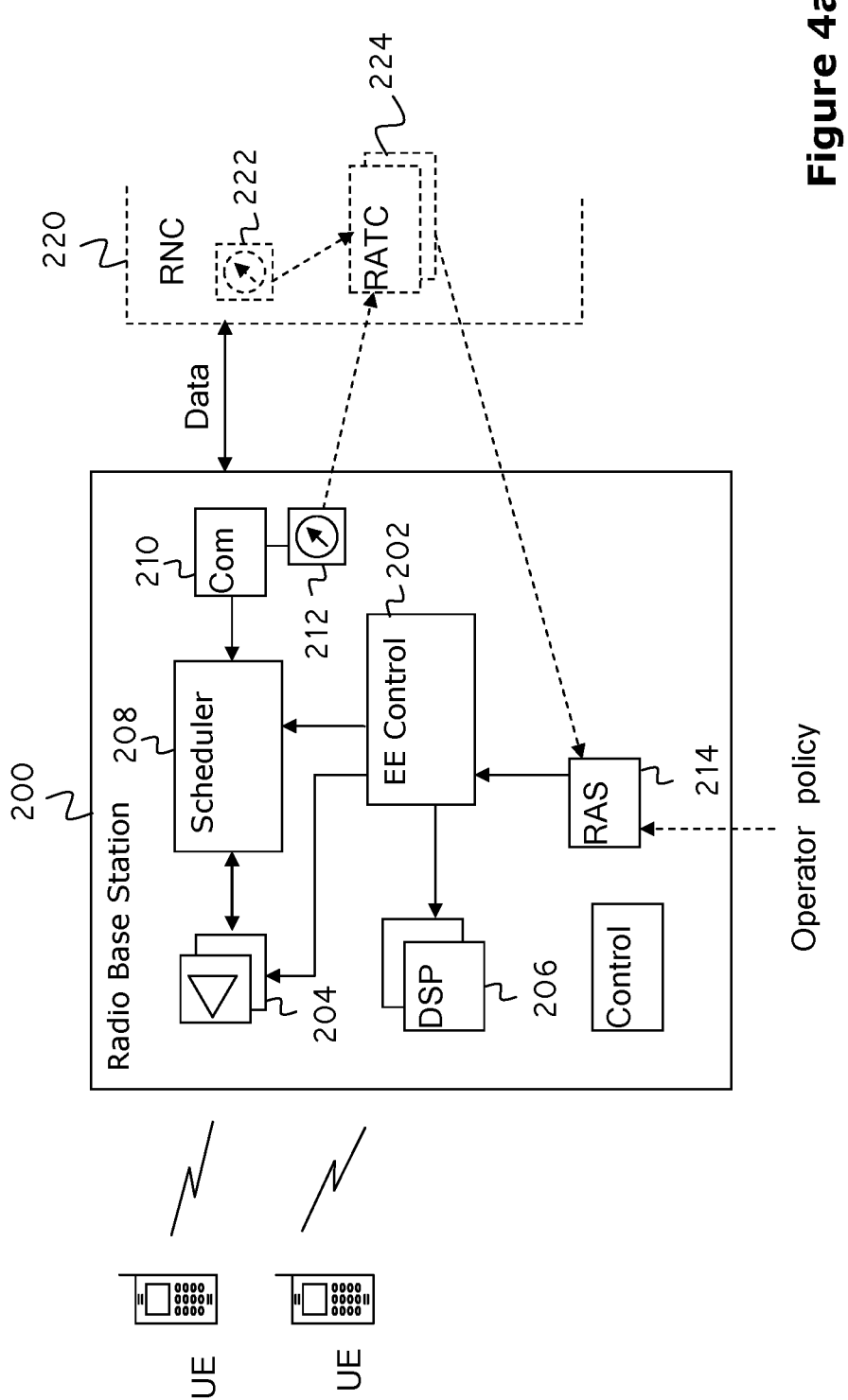
FIG. 4 a-b are schematic illustrations of arrangements, according to possible embodiments.
Figure 4B:
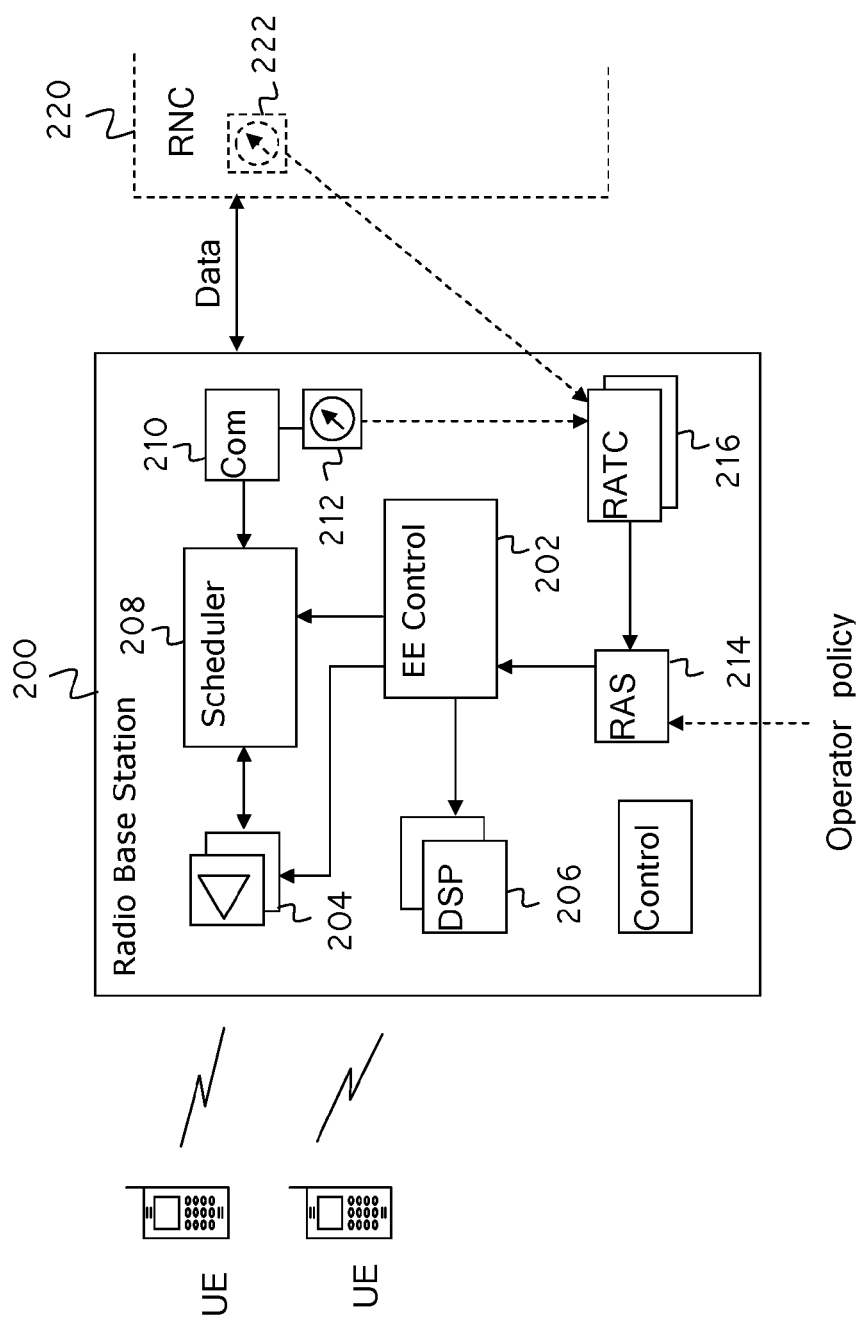

With reference to FIGS. 4a-b, which are schematic block diagrams, two radio base stations 200 will now be described in accordance with further exemplifying embodiments.

These embodiments are two alternative embodiments which are related to the embodiment described in accordance with FIG. 2. Therefore, and in order to simplify the understanding of the disclosed concept, the same reference numbers will be used where appropriate. The radio base stations 200 are implemented as NodeBs, 200, i.e. RBSs of HSPA communication networks. In the figures it is illustrated that the NodeBs 200 serve UEs (User Equipments), which are associated to the NodeBs via RANs. Typically, the eNodeBs 200 also comprise conventional functionality to operate properly, which is illustrated with a control unit and a communication interface, respectively. However, in order to simplify the understanding such conventional functionality has been omitted in this description.

Regarding FIG. 4a, the NodeB comprises the functionality and components of the NodeB of FIG. 2. However, in addition to the NodeB of FIG. 2, the NodeB comprises an RAS (RAN Adaptation Selection) unit 214 which is adapted to decide or select that an RF power of the NodeB will be adjusted, and request the EE controller to adjust the RF power accordingly.

Regarding FIG. 4b, the NodeB comprises the functionality and components of the NodeB of FIG. 4a, however, in addition to the NodeB of FIG. 4a, the NodeB comprises an RATC (RAN Aggregation Transport Characteristics) unit 216 which is adapted to compile results of measurements of transport characteristics in the backhaul network. The RATC is further adapted to obtain the measurements results from reporting unit 212, 222, arranged in suitable communication network nodes, e.g. the NodeB 200, an RNC (Radio Network Controller) 220, or any other suitable communication network node adapted to conduct measurements backhaul characteristics.

The above described exemplifying embodiments have been schematically illustrated. It is to be noted that a designer is not limited to implement exactly the illustrated units and components when designing the RBSs and implementing the functionality of to the disclosed concept. He/she will be capable to implement functionality of any described unit in another suitable unit, when appropriate.

Figure 5:
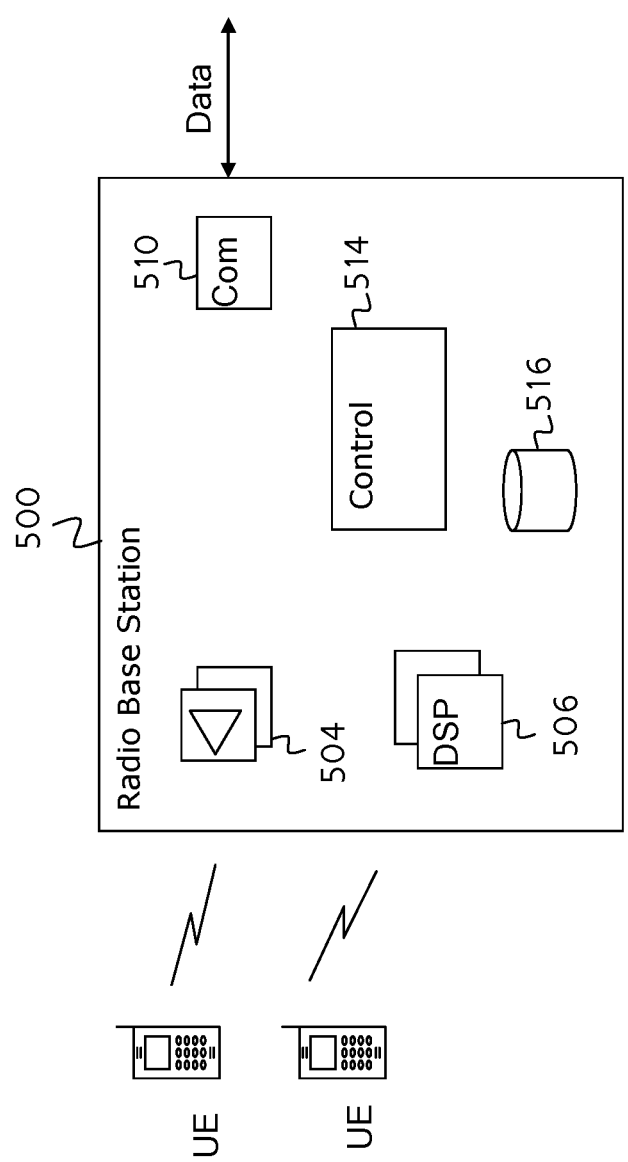
FIG. 5 is a schematic illustration of an arrangement, according to possible embodiments.

With reference to FIG. 5, which is a schematic block diagrams, a possible implementation of an RBS 500 will now be described in accordance with an exemplifying embodiment. The RBS 500 comprises at least one PA, (Power Amplifier) 504, at least one DSP (Digital Signal Processor), a communication interface 510, a controller 514, and a memory 516. The RBS 500 is adapted to execute the actions 300-312, described with reference to FIG. 3. The controller 514 may be constituted by any suitable Central Processing Unit, CPU, microcontroller, Digital Signal Processor, DSP, etc., capable of executing computer program code. The computer program may be stored in the memory 516. The memory 516 may be any combination of a Random Access Memory, RAM, and a Read Only Memory, ROM. The memory 516 may also comprise persistent storage, which, for example, can be any single one or combination of magnetic memory, optical memory, or solid state memory or even remotely mounted memory. The RBS 500 further comprises a communication interface 510 arranged for communicating DL (Downlink) data and UL (Uplink) data with other devices or nodes, such as a UEs (User Equipments) and communication network nodes. The PAs 504 are applied for providing sufficient RF (Radio Frequency) power to DL radio signals to be transmitted to the UEs.

The DSPs 506 are applied to provide calculation capacity to the RBS, e.g. for signal processing of DL data signals and UL data signals, respectively.

Figure 6:
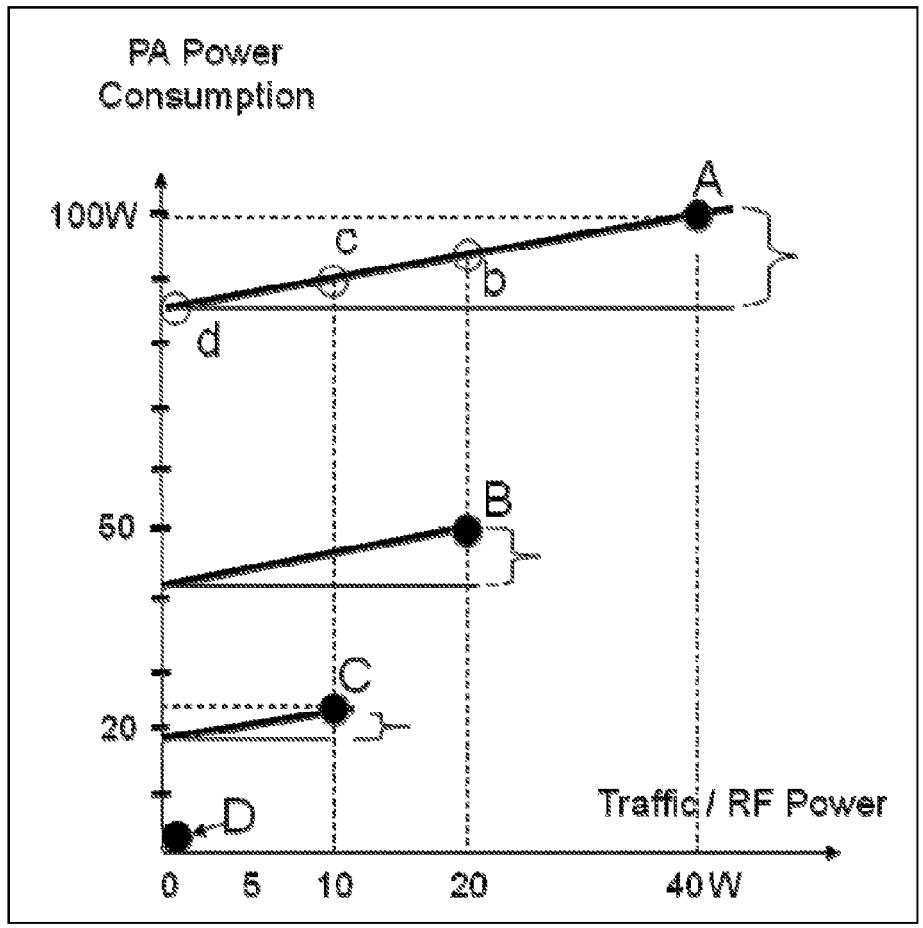
FIG. 6 is a schematic graph, according to a possible embodiment.

In order to illustrate advantages of adjusting output RF power of RBSs, by adjusting bias voltages of PAs of the RBSs, an example will now be described with reference to the schematic graphs of FIG. 6.

In the graph, four operation scenarios are illustrated for a PA, when providing RF power:

The upper graph illustrates a scenario when no adjustment of bias voltage of the PA is performed, and is also described in the table below in the two left columns. When providing an RF output power of 40 W a DC (Direct Current) power of about 100 W is required, i.e. the bullet "A". When decreasing the RF output power to 20 W, a DC power of about 95% is required, i.e. the unfilled ring "b". When decreasing the RF output power to 10 W, a DC power of about 90% is required, i.e. the unfilled ring "c". When decreasing the RF output power further, the DC power may be reduced further, i.e. the unfilled ring "d". However, a DC power of about 85% is still required.

In the graph below is instead a scenario illustrated where the RF output power is adjusted by adjusting the bias voltage of the PA. An RF output power of 20 W requires a DC power of about 50 W when rebiasing, which enables a reduction of 47%, i.e. the bullet "B". Correspondingly, the graph below illustrates that an RF output power of 10 W requires a DC power of 25 W, which enables a reduction of 72%, i.e. the bullet "C". The last graph illustrated the scenario when the PA is switched off, i.e. the bullet "D". Then the PA consumes no DC power, which enables a reduction of 100%.

| RF Power | DC Power without rebias (W) | DC Power with rebias (W) | Saving |
|---|---|---|---|
| 40 | ~100 W (A) | - (No rebias) | 0 |
| 20 | ~95 W (b) | ~50 W (D) | 47% |
| 10 | ~90 W (c) | ~25 W (E) | 72% |
| 0 | ~85 W (F) | ~0 W (F) | 100% |

The backhaul characteristics value of the above described embodiments may be implemented as a numerical value, representing an overall status of the backhaul transport characteristics, e.g. in a scale "1-10", where "10" indicates full capacity and "1" severely restricted backhaul transport characteristics, or values reporting summarized backhaul characteristics like used and available bandwidth, delay, jitter etc. for a specific RBS.

In the described exemplifying embodiments, the reporting units 212, 222, 242 are arranged to perform an End-to-End measurement of variations in delay for transmitted data in the backhaul network, according to TWAMP (Two-way Active Measurement Protocol). However, the reporting units are not limited to performing End-to-End measurements, they may be implanted alternatively within the disclosed concept. For instance, the reporting units 212, 222, 242, may instead be adapted to perform other measurements of variations for network delays and transport capacities, e.g. according to BART (Bandwidth Available in Real-Time), Transport timing interval for real-time service packets, ECN (Explicit Congestion Notification), CONEX (Partial Congestion Exposure), etc. In addition, further information may be taken into account when compiling measurement results into the backhaul characteristics value, e.g. information regarding the present load, or trends in variation of the load of the backhaul network. It is also to be noted that suitable operator policies may be pre-set (illustrated in FIG. 2, 4a, 4b), which may be applied as further basis when deciding or selecting that output levels of NodeBs will be adjusted.

It is to be noted that the communication network nodes of the described exemplifying embodiments are described in a non-limiting manner. However, a designer may select to implement further communication network nodes between the described communication network nodes within the described concept, such that the measurement results and backhaul characteristics values are obtained via these further communication network nodes. Moreover, the figures and embodiments illustrate a plurality of functional units in a non-limiting manner. However, a physical implementation of the proposed communication network nodes may be performed alternatively within the disclosed concept. For instance, functionality of a specific illustrated unit may be implemented in another suitable unit when put into practice.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by a radio base station for adapting a Radio Access Network (RAN) capability, in response to variations in transport characteristics comprising at least one of data transfer rate, maximum available bandwidth, and maximum used bandwidth, of a backhaul network, wherein the radio base station is arranged to communicate data between a RAN and the backhaul network, said method comprising:
  obtaining, by a controller, information related to the transport characteristics of the backhaul network,
  determining, by the controller, based on the obtained information, an output level of the radio base station, and
  adjusting, by the controller, the output level of the radio base station to the determined output level,
  wherein the radio base station comprises a plurality of Digital Signal Processors (DSPs), and the method further comprises:
    checking if the adjusted output level is below a predetermined threshold, and when the adjusted output level is below the threshold, switching off at least one DSP of the plurality of DSPs.

2. The method according to claim 1, wherein adjusting the output level comprises adjusting a bias voltage level of a Power Amplifier (PA) provided in the radio base station.

3. The method according to claim 2, wherein adjusting the output level is performed by setting the PA bias voltage to 0, storing Downlink (DL) data to be transmitted in the radio base station, and postponing scheduling of the DL data.

4. The method according to claim 1, wherein the information is obtained as a request to adjust the output level of the radio base station, from a RAN adaptation selection unit of a communication network node of the backhaul network.

5. The method according to claim 1, wherein the information is obtained as a backhaul characteristics value from a communication network node of the backhaul network, the backhaul characteristics value being a compiled result of at least one measurement of the transport characteristics of the backhaul network, the backhaul characteristics value to be applied when the output level of the radio base station is determined.

6. The method according to claim 1, wherein the information is obtained as a result of at least one measurement of the transport characteristics of the backhaul network, and the result of the at least one measurement is compiled into a backhaul characteristics value, the backhaul characteristics value to be applied when the output level of the radio base station is determined.

7. The method according to claim 6, wherein the at least one measurement is performed as an End-to-end measurement between the radio base station and another communication network node, in accordance with any of: Two-way Active Measurement Protocol and One-way Active measurement Protocol, or
  wherein the at least one measurement is performed in accordance with any of:
  Bandwidth available in Real-Time (BART), Explicit Congestion Notification (ECN), End-to-end delay, and Partial Congestion Exposure (CONEX).

8. A radio base station for adapting a Radio Access Network (RAN) capability, in response to variations in transport characteristics, comprising at least one of data transfer rate, maximum available bandwidth, and maximum used bandwidth, of a backhaul network, wherein the radio base station is arranged to communicate data between a RAN and the backhaul network, said radio base station comprising:
  a controller adapted to obtain information related to the transport characteristics of the backhaul network, determine, based on the obtained information, an output level of the radio base station, and adjust the output level of the radio base station to the determined output level,
  wherein the radio base station further comprises a plurality of Digital Signal Processors (DSPs), and
  wherein the controller is further adapted to check if the adjusted output level is below a predetermined threshold, and to switch off at least one DSP of the plurality of DSPs when the adjusted output level is below the threshold.

9. The radio base station according to claim 8, further comprising a Power Amplifier (PA) wherein the controller is adapted to adjust the output level of the radio base station by adjusting a bias voltage of the PA.

10. The radio base station according to claim 9, wherein the controller is adapted to perform the adjustment of the output level by setting the PA bias voltage to 0, storing the Downlink (DL) data to be transmitted in the radio base station, and postponing scheduling of the DL data.

11. The radio base station according to claim 8, wherein the controller is adapted to obtain the information as a request to adjust the output level of the radio base station, from a RAN adaptation selection unit of a communication network node of the backhaul network.

12. The radio base station according to claim 9, wherein the controller is adapted to obtain the information as a backhaul characteristics value from a communication network node of the backhaul network, the backhaul characteristics value being a compiled result of at least one measurement of the transport characteristics of the backhaul network, the backhaul characteristics value to be applied when the output level of the radio base station is determined.

13. The radio base station according to claim 8, wherein the controller is adapted to obtain the information as a result of at least one measurement of the transport characteristics of the backhaul network, and further adapted to compile the information into a backhaul characteristics value, the backhaul characteristics value to be applied when the output level of the radio base station is determined.

14. The radio base station according to claim 13, wherein the at least one measurement is performed as an End-to-end measurement between the radio base station and a communication network node, in accordance with any of: Two-way Active Measurement Protocol (TWAMP) and One-way Active measurement Protocol (OWAMP), or
  wherein the at least one measurement is performed in accordance with any of: Bandwidth available in Real-Time (BART), Explicit Congestion Notification (ECN), End-to-end delay, and Partial Congestion Exposure (CONEX).

* * * * *